United States Patent
Gaiser

[15] 3,701,257
[45] Oct. 31, 1972

[54] HYDRAULIC MASTER CYLINDER
[72] Inventor: Robert F. Gaiser, St. Eph, Mich.
[73] Assignee: The Bendix Corporation
[22] Filed: April 12, 1971
[21] Appl. No.: 133,047

[52] U.S. Cl. ..............60/54.6 E, 60/54.6 R, 188/345
[51] Int. Cl. ................................................F15b 7/00
[58] Field of Search ..........60/54.6 R, 54.5 E, 54.6 E; 188/345

[56] References Cited

UNITED STATES PATENTS

| | | |
|---|---|---|
| 3,488,959 | 1/1970 | Tenniswood............60/54.6 E |
| 3,357,183 | 12/1967 | Krieger....................60/54.6 E |
| 3,064,432 | 11/1962 | Shutt........................60/54.6 E |
| 3,044,268 | 7/1962 | Harrison..................60/54.6 R |
| 3,232,059 | 2/1966 | Thesier....................60/54.6 R |

*Primary Examiner*—Edgar W. Geoghegan
*Assistant Examiner*—A. M. Zupcic
*Attorney*—Plante, Hartz, Smith and Thompson

[57] ABSTRACT

A hydraulic brake pressurizing mechanism for a motor vehicle including a dual master cylinder having independent connections to front and rear brakes of the vehicle. The front and rear brakes are in communication respectively with first and second variable volume chambers formed in the cylinder housing by two telescoping pistons reciprocally positioned therein for displacement of fluid from said chambers upon actuation. A fluid reservoir communicates with said chambers via tilt valve means actuable in response to movement of one of said pistons.

5 Claims, 1 Drawing Figure

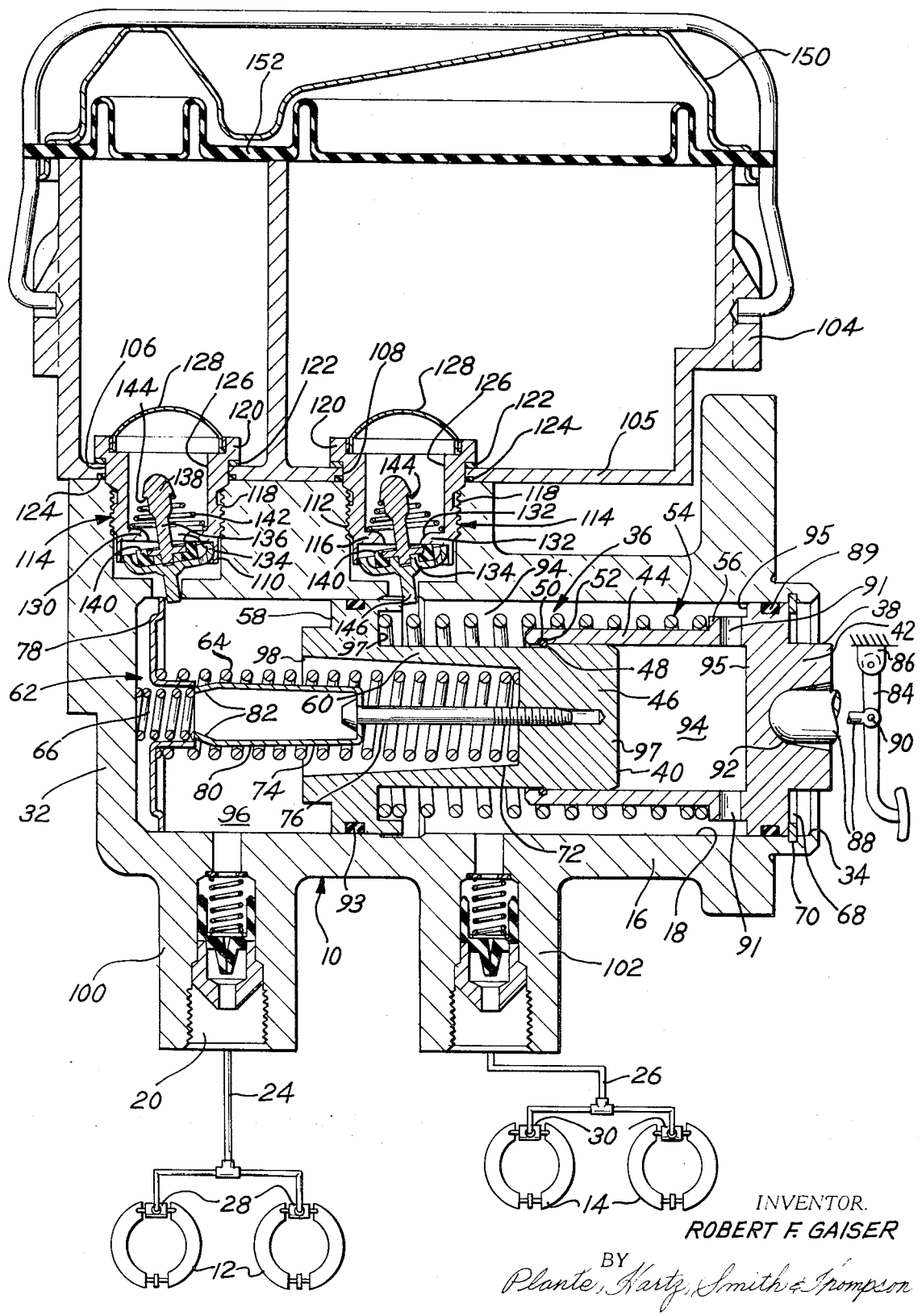
INVENTOR.
ROBERT F. GAISER

HYDRAULIC MASTER CYLINDER

BACKGROUND OF THE INVENTION

The invention concerns generally pressurizing devices for hydraulic brakes, and more specifically dual hydraulic brake master cylinders for motor vehicles. The last decade has seen many safety innovations incorporated into vehicle braking systems including the introduction of the dual hydraulic system providing for independent lines to front and rear brakes. Because of the independent connections to separate pressurizing chambers of the master cylinder the over-all length of the master cylinder housing was increased. The lengthening requirement of the dual master cylinder has presented a design problem because of space limitations under the hood of today's vehicle. This problem has been minimized by the invention disclosed herein.

With reference to the prior art, it will be noted that U.S. Pat. No. 2,683,352, assigned to the common assignee, shows a tilting valve associated with a single line master cylinder for controlling communication between the reservoir and master cylinder bore.

SUMMARY OF THE INVENTION

In view of the foregoing, an important object of my invention is to provide a dual system master cylinder in which the over-all weight and length compared to other dual master cylinders is substantially reduced.

Another important object of the invention is to provide a dual master cylinder which utilizes two telescoping pistons actuable simultaneously and independently in pressurizing the front and rear brakes.

A still further object of the invention is to provide a dual master cylinder having telescopically arranged pistons therein forming chambers each communicating with a reservoir via tilting valve means, the latter of which is controlled by axial displacement of one of said pistons.

A very important object of the invention is to provide a hydraulic dual master cylinder having two variable volume chambers therein from which fluid displacement is effected by advancing two pistons respectively, one of which is equipped with preloaded spring means including a spring retainer operatively connected with valve means for controlling communication with the master cylinder reservoir and yieldable upon abutting a stop to thereby allow said one piston to continue to advance in its associated chamber.

An object of the invention resides in the construction of individual reservoir and master cylinder housings held in cooperative relationship by valve means.

The above and other objects and features of the present invention will become apparent from the following description taken in connection with the accompanying drawing.

DESCRIPTION OF THE DRAWINGS

The drawing illustrates schematically a dual hydraulic brake system in which a master cylinder embodying the principles of the invention is shown in longitudinal cross section.

DETAILED DESCRIPTION

The fluid pressurizing device 10 in which the invention is embodied is illustrated in a dual hydraulic brake system for a vehicle having front brakes 12 and rear brakes 14. The device 10, more specifically termed a dual master cylinder, includes a housing 16 having a bore 18 therein. Outlet ports 20 and 22 in the housing communicate respectively with the front brakes 12 and the rear brakes 14. Conduits 24 and 26 connect the ports 20 and 22 respectively, to wheel cylinders 28 and 30 of the front and rear brakes. The cylinder housing or bore 18 is closed on one end by wall 32. The other or opposite end 34 is open to facilitate assembling piston means 36 within the cylinder. For convenience of illustration the ports 20 and 22 are shown connected to the lower side of the cylinder 18. In actual design practice these ports would probably be connected to the cylinder above its center line to facilitate purging the system and to minimize the deposit of contaminants in the ports.

The piston means 36, which is reciprocally positioned within the bore, includes a first or primary piston 38 and a second or secondary piston 40. The pistons 38 and 40 are telescopically arranged one with respect to the other within the bore. The primary piston 38 is formed with a head portion 42 and a skirt section 44. The skirt section 44 telescopes over end 46 of the secondary piston 40. The outside diameter of the end 46 is slightly oversize to provide an abutment 48 which is engaged by locking ring 50 carried in a groove 52 formed in the skirt section 44. This prevents separation of the pistons and determines their combined over-all length when assembled within the cylinder 18. The pistons are retained in this telescopically relatively movable relationship by spring means 54 interposed between a radial flange 56 on the skirt 44 and land 58, integral with skirt section 60 of the piston 40. The spring means 54 is selected to be preloaded when caged or assembled between the pistons 38 and 40, thus extending the pistons to their desired over-all length which is dictated by system design requirements. Additional spring means 62, comprising a preloaded spring 64 and piston return spring 66, is interposed between the secondary piston 40 and end wall 32 to thereby urge the pistons 38 and 40 to their brake release position in the bore 18, so that the head portion 42 of the piston 38 abuts retaining ring 68 secured in groove 70 of the cylinder bore 18. The preloaded spring 64 has one end located within the recess 72 of the piston 40. The other end of the spring is secured in the cage or retainer member 74. A bolt 76 threadedly and adjustably holds the retainer member 74 and spring 64 in the desired preload relationship with respect to the preload of spring means 54. One end of the spring 64 abuts a lateral projecting flange 78 of the retainer 74. The other end of the spring 64 engages the bottom wall of the recess 72. The end wall 32 functions as a stop for the flange 78 of the cage 74 upon advancement of the pistons. A tubular portion 80 of the cage 74 telescopes within the recess 72 and is formed with inwardly protruding tabs 82 against which one end of the coil spring 66 abuts. The opposite end of the return spring 66 abuts the end wall 32. Caging the spring 64 in the retainer member 74 as shown allows the piston 40 to advance in the chamber 96 against said spring preload notwithstanding engagement between said retainer member and said stop or end wall 32, thereby utilizing the full piston stroke. That is, the collapse of the preloaded spring 64 permits the piston 40 to continue to advance in chamber 96 although the flange 78 of the retainer member abuts the wall 32. Combining the arrangement between the piston 40 and the preloaded spring means 62 with the telescoping pistons produces a design approaching the optimum, in length and weight reduction of dual master cylinders.

The piston means 36, as viewed in the drawing, is shown in its unapplied or brake release position in the cylinder 18. It is moved to its brake applied position by depressing brake pedal lever 84 pivoted about bracket 86 carried on a fixed portion of the vehicle. A force transmitting rod 88 is pivoted at 90 to the brake pedal lever. The other end of the rod 88 is located in a socket 92 of the head portion 42 which allows for swiveling within the socket as the piston 38 moves toward the closed end of the bore. The piston means 36, which includes the pistons 38 and 40 and spring means 54 and 62, together with the bore divides the bore into first and second variable volume chambers 94 and 96. The first chamber 94 is formed in the cylinder bore between the interior face 95 of the piston 38 and the face 97 of the piston 40 which face 97 is oppositely disposed to the face 95. The chamber 96 is formed in the cylinder bore 18 between the face 98 of the piston 40 and end wall 32 which, of course, is an integral part of the cylinder bore. The variable volume chambers 94 and 96 communicate with the front and rear brakes respectively, through outlets 20 and 22. An O-ring or seal 89 in the head portion 42 of the piston 38 seals the chamber 94 from leakage to atmosphere. Radial passages 91 connect the two spaces formed centrally and annularly of the skirt 44. Together these spaces form the chamber 94. An O-ring or seal 93 is carried in the land 58 to seal the chambers 94 and 96 from intercommunication. Residual pressure check valves 100 and 102 maintain a predetermined pressure at all times in the lines 24 and 26, in a manner well known to those skilled in the art. The residual pressure valves 100 and 102 form no part of the present invention.

The fluid reservoir housing 104 is formed with openings 106 and 108 which register with similar openings 110 and 112, located at the bottom of the stroke of pistons 40 and 38, respectively, in the cylinder housing 16. The openings 110 and 112 are threaded for receiving valve means 114 comprising a body member 116 having a threaded portion 118 for attaching said valve means to the cylinder housing 16 and at the same time releasably securing the reservoir housing 104 thereto. The openings 106 and 110 of the reservoir housing 104 and cylinder housing 16, respectively, form one set of openings communicating said fluid reservoir with the chamber 96 and the openings 108 and 112 of the reservoir housing 104 and cylinder housing 16, respectively, form a second set of openings communicating said fluid reservoir with the chamber 94. Communication through each set of openings is controlled by identical valve means 114 to which the same reference numerals have been applied. The body member 116 is removably anchored or threaded into each set of openings thereby securing the housings together. The body member 116 is provided with a flange 120 which overlies the bottom portion 105 of the reservoir contiguous said openings 106 and 108. A washer 122 is located under the flange 120. A static seal 124 is positioned in each of the openings 106 and 108 in sealing relationship to the outer portion of the body member 116. This static seal prevents high pressure leakage from the master cylinder bore 18 to atmosphere or to the interior of the reservoir. It also prevents leakage from the interior of the reservoir 104 to atmosphere. The body 116 is formed with an axial passage or opening 126 communicating with the interior of the reservoir 104. A filter or screen 128 covers the opening 126 at its upper end to prevent contaminants from entering the brake system. The lower end of the opening 126 of the body 116 is formed with a flange 130 having a passage 132 therein which communicates the reservoir 104 with the cylinder bore 18. A valve member 134 controls fluid communication between the reservoir 104 and the cylinder bore 18. The valve member 134 is equipped with a valve stem 136 having a bulb-shaped upper portion 138 and a seat portion 140 at its lower end which sealingly abuts the flange 130 to cut off fluid flow from the cylinder bore 18 to the reservoir 104. A conical spring 142 has its small diameter end abutting a shoulder 144, of the bulb-shaped portion 138, and its large diameter end abutting the flange 130 to thereby urge the seal portion 140 of the valve member 134 against the flange 130. The valve member is further provided with an elongated stem 146 projecting through the openings 110 and 112 into the cylinder bore 18 for operative engagement with the piston means 36. The elongated stem 146 of the valve means on the left is engaged by the lateral projecting flange 78 of the retainer 74, holding the valve means open to communicate the reservoir with the system. The elongated stem 146 of the valve means on the right is engaged by the land 58 of the piston 40, holding the valve means open to communicate the reservoir with the system. The valve means 114, as is well known to those skilled in the art, functions as a fluid compensating valve for the brake system in its open position with the piston means 36 at the top of the stroke in the brake released position, as shown, and as a replenishing or check valve when seated during retractive action of the piston means to thereby permit fluid in the reservoir to flow into the chambers 94 and 96 in the event the pressure in said chambers drops below atmospheric pressure. That is, the conical spring 142 is designed to collapse when the pressure in cylinder chambers 94 and 96 drops to some value less than atmospheric pressure to admit fluid from the reservoir thereby replenishing chambers 94 and 96. A cap 150 and a flexible sealing cover 152 close the topside of the reservoir 104 against contaminants but permitting atmospheric pressure to act on the flexible cover to maintain the desired system pressure.

MODE OF OPERATION

As illustrated in the drawing, the master cylinder is in its brake release position. At this time the primary and secondary pistons 38 and 40, under the influence of their respective spring means 54 and 62, are biased to the right end of the cylinder with the head 42 of piston 38 abutting the retaining ring 68 and the land 58 of the piston 40 engaging the stem 146 of the valve means 114 on the right, as seen in the drawing, unseating the valve member 134 to communicate the reservoir with the cylinder chamber 94. The preloaded spring means 62 which regulates the pumping action of the secondary piston 40 on its return stroke is adjusted so that the flange 78 of the retainer 74 unseats the valve member 134 of the valve means on the left, as viewed in the drawing, connecting the cylinder chamber 96 to reservoir.

To apply the brakes the operator presses on the pedal 84 which transmits a force into the piston head 42 causing the entire piston means 36 comprising pistons 38 and 40 to move simultaneously to the left in the cylinder. Initial piston movement to the left compresses return spring 66 and disengages the stems 146, permitting the valve members 134 to seat to thereby cut off communication to the reservoir 104. Continued movement of the pistons to the left first develops a pressure in the chamber 96 in communication with the front brakes 12. The first pressure build-up is in this chamber because the spring means 64 is first to collapse since it has a slightly lower spring load than the spring means 54. As the brake application continues, the pressure developed in the chamber 96 plus the force build-up in the spring means 62 is sufficient to resist further movement of the secondary piston 40, at which time the piston 38 telescopically moves relative to the piston 40, developing an actuation pressure in the chamber 94 which is communicated to the rear brakes 14. Any further brake applying force to the pedal 84 will be transmitted through the piston means 36 to overcome the spring means 54 and 62 uniformly, displacing fluid from the chambers 94 and 96 to simultaneously continue actuation of the front and rear brakes with substantially equal fluid pressure.

In order to minimize compensation loss, the spring means 54 is designed to have a spring load, i.e., an installed preload, such that on a brake application the primary piston will overcome the return spring 66 and secondary piston seal friction. The spring 54 must also have sufficient preload to actuate the secondary piston 40 during a panic stop, i.e., a rapid brake application, thereby assuring simultaneous closing of the tilting valves. Moreover the force build-up in spring 54 during braking must be adequate to overcome the primary piston seal friction in addition to supplying sufficient force to maintain pumping action in the primary chamber 94, upon brake release. The spring load of the spring 64, i.e., the installed spring preload, is slightly less than that of the spring 54 but greater than the return spring 66, thereby overcoming the return spring load on the brake applied stroke. The energy stored in the spring 64 during braking must be such as to overcome the primary and secondary piston seal friction in addition to furnishing sufficient force to maintain pumping action in the chamber 96, upon brake release, i.e., return stroke. The return spring 66, which obviously has the lowest spring load, i.e., lowest installed spring preload, must be capable of overcoming the primary and secondary piston seal friction and of opening the two valves 114 on the return stroke.

Upon release of the brake pedal 84 the fluid in the brake system which is under pressure will attempt to stabilize itself by returning to the chambers 94 and 96 and reservoir 104. The pistons 38 and 40, under the influence of the energy stored in the spring means 54 and 62, will be moved to the right in the cylinder bore 18. During this movement of the pistons 38 and 40 and prior to opening of the valve members 134 by engagement with the stems 146, the pumping action of the pistons 38 and 40 in their respective chambers 94 and 96 is such as to unseat the valve seats 140 from flanges 130 against the force of conical springs. This pumping action of the pistons creates a pressure in the chambers 94 and 96 less than atmospheric pressure and since the fluid in the reservoir 104 is subjected to atmospheric pressure, the valves 134 are opened to admit fluid to the chambers to compensate for this reduction in pressure. Upon further movement of the piston means 36 to the right the valve stems 146 are engaged by the retainer flange 78 and land 58, causing the valves 114 to open to communicate the system with the reservoir.

I claim:

1. In a hydraulic brake system for a motor vehicle having front and rear brakes, a master cylinder for actuating said brakes comprising:

a hydraulic fluid reservoir having a first opening and a second opening along the bottom thereof;

housing means having a bore therein, said bore having a first opening and a second opening along the top thereof corresponding to the first and second openings in said hydraulic fluid reservoir;

piston means telescopically positioned to reciprocate within said bore, said piston means having a first piston which slides within a second piston, said first piston having an effective diameter substantially equal to said second piston, said first piston and said second piston dividing said bore into a first variable volume chamber and a second variable volume chamber independent of each other, said first variable volume chamber being connected to said front brakes and said second variable volume chamber being connected to said rear brakes;

cage means secured to said first piston;

first resilient means located between said cage means and said first piston means for urging said first piston away from said cage means for establishing the size of the first variable volume chamber;

second resilient means located between said first and second pistons for establishing the size of said second variable volume chamber;

return spring means located between the bottom of said bore and said cage means for urging the piston means against a stop in said bore;

first valve means located in said first opening in said reservoir having a first stem extending into said first variable volume chamber, said first stem being adapted to engage said cage means permitting fluid in the reservoir unrestricted flow into said first variable volume chamber with the piston means against the stop;

second valve means located in said second opening in said reservoir having a second stem extending into said second variable volume chamber, said second stem being adapted to engage said first piston permitting fluid in the reservoir unrestricted flow into the second variable volume chamber with the piston means against the stop; and actuation means for transferring an initial operational force on said second piston moving said first piston through said second resilient means by overcoming said return spring means to simultaneously close the first and second valve means to interrupt fluid communication between the reservoir and the first and second variable volume chambers, said actuation means upon intensifying the operational force moving the first piston in the first variable volume chamber to displace fluid to the front brake and develop a first fluid pressure, said first fluid pressure and further intensification of the operational force overcoming the second resilient means allowing the second piston to telescopically move within the first piston and develop a second fluid pressure in the second variable volume chamber for operating the rear brakes, said first and second fluid pressures being substantially equal since the effective diameter of the first and second pistons are substantially equal and thereby uniformly continue energization of said front and rear brakes in response to an effective intensified operational force from said actuation means.

2. The master cylinder, as recited in claim 1, wherein said first resilient means yields to the movement of the first piston after closing the first valve means to provide a full stroke for displacing fluid from the first variable volume chamber to the front brakes.

3. The master cylinder, as recited in claim 2, wherein said second resilient means yields to the reactive force of the first piston and the intensified operational force to provide a full stroke for the second piston to displace fluid from the second variable volume chamber to the rear brakes.

4. The master cylinder, as recited in claim 2, wherein said first valve means includes:
 a body member having a flange for engaging the bottom of the reservoir surrounding the first opening for securing the reservoir to the housing means; and
 static seal means located between the reservoir and the housing means and adjacent the body for preventing fluid under pressure from leaking from the first variable volume chamber around said body.

5. The master cylinder, as recited in claim 3, wherein said second valve means includes:
 a body member having a flange for engaging the bottom of the reservoir surrounding the second opening for securing the reservoir to the housing means; and
 static seal means located between the reservoir and the housing means and adjacent the body for preventing fluid under pressure from leaking from the second variable volume chamber around said body.

* * * * *